United States Patent
Wasik et al.

(10) Patent No.: US 10,755,433 B2
(45) Date of Patent: Aug. 25, 2020

(54) METHOD AND SYSTEM FOR SCANNING AN OBJECT USING AN RGB-D SENSOR

(71) Applicant: TOYOTA MOTOR EUROPE, Brussels (BE)

(72) Inventors: Zbigniew Wasik, Brussels (BE); Wadim Kehl, Munich (DE); Nassir Navab, Munich (DE)

(73) Assignee: TOYOTA MOTOR EUROPE, Brussels (BE)

( * ) Notice: Subject to any disclaimer, the term of this patent is extended or adjusted under 35 U.S.C. 154(b) by 23 days.

(21) Appl. No.: 15/506,991

(22) PCT Filed: Aug. 29, 2014

(86) PCT No.: PCT/EP2014/068430
§ 371 (c)(1),
(2) Date: Feb. 27, 2017

(87) PCT Pub. No.: WO2016/029970
PCT Pub. Date: Mar. 3, 2016

(65) Prior Publication Data
US 2017/0287162 A1    Oct. 5, 2017

(51) Int. Cl.
*G06T 7/73* (2017.01)
*G06T 7/579* (2017.01)

(52) U.S. Cl.
CPC .............. *G06T 7/73* (2017.01); *G06T 7/579* (2017.01); *G06T 2200/04* (2013.01);
(Continued)

(58) Field of Classification Search
CPC .................. G06T 2200/04; G06T 2207/10028
See application file for complete search history.

(56) References Cited

U.S. PATENT DOCUMENTS 6,249,600 B1 * 6/2001 Reed ................. G06T 17/00
  345/420
9,036,943 B1 * 5/2015 Baldwin ............ G06K 9/00664
  382/284

(Continued)

FOREIGN PATENT DOCUMENTS

JP    2002-342785 A    11/2002
JP    2011-192228 A    9/2011

OTHER PUBLICATIONS

Erik Bylow et al., Real-Time Camera Tracking and 3D reconstruction using Signed Distance Functions, p. 1-8, Robotics: Science and Systems 2013 (Year: 2013).*

(Continued)

*Primary Examiner* — Gandhi Thirugnanam
(74) *Attorney, Agent, or Firm* — Oblon, McClelland, Maier & Neustadt, L.L.P.

(57) ABSTRACT

A method and system for scanning an object using an RGB-D sensor, the method includes: a plurality of elementary scans of the object using an RGB-D sensor and visual odometry, each elementary scan delivering a plurality of key frames associated with a pose of the sensor with respect to the object, and each elementary scan being associated with a position of the object; for each elementary scan, elaborating a three-dimensional model of the object using the plurality of key frames and poses of the scan; merging each three-dimensional model into a merged three-dimensional model of the object.

10 Claims, 4 Drawing Sheets

(52) U.S. Cl.
CPC .............. *G06T 2207/10016* (2013.01); *G06T 2207/10028* (2013.01); *G06T 2207/20072* (2013.01); *G06T 2207/30244* (2013.01)

(56) References Cited

U.S. PATENT DOCUMENTS

| | | | | |
|---|---|---|---|---|
| 10,019,801 | B2* | 7/2018 | Bourmaud | G06T 7/337 |
| 2007/0014457 | A1* | 1/2007 | Jolly | G06T 7/12 |
| | | | | 382/128 |
| 2013/0039725 | A1* | 2/2013 | Clausen | B65G 47/846 |
| | | | | 414/222.01 |
| 2014/0022352 | A1* | 1/2014 | Fisker | G06T 5/003 |
| | | | | 348/46 |
| 2014/0104387 | A1* | 4/2014 | Klusza | H04N 13/271 |
| | | | | 348/46 |
| 2014/0139639 | A1* | 5/2014 | Wagner | G06T 17/00 |
| | | | | 348/46 |
| 2014/0212832 | A1* | 7/2014 | Fisker | A61B 5/0062 |
| | | | | 433/29 |
| 2015/0018613 | A1* | 1/2015 | Hollenbeck | A61B 1/00096 |
| | | | | 600/109 |
| 2015/0111177 | A1* | 4/2015 | Fisker | A61C 13/01 |
| | | | | 433/196 |
| 2015/0117708 | A1* | 4/2015 | Guigues | G06T 7/0042 |
| | | | | 382/103 |
| 2015/0145957 | A1* | 5/2015 | Son | H04N 1/00827 |
| | | | | 348/46 |
| 2015/0243035 | A1* | 8/2015 | Narasimha | G06T 19/20 |
| | | | | 382/154 |
| 2015/0261184 | A1* | 9/2015 | Mannion | G06T 17/00 |
| | | | | 348/41 |
| 2016/0086350 | A1* | 3/2016 | Michel | G06K 9/00362 |
| | | | | 382/103 |
| 2016/0210753 | A1* | 7/2016 | Klusza | H04N 13/271 |
| 2017/0287162 | A1* | 10/2017 | Wasik | G06T 7/579 |
| 2018/0047208 | A1* | 2/2018 | Marin | G06T 11/001 |
| 2018/0253909 | A1* | 9/2018 | Chen | G06T 19/20 |
| 2019/0026943 | A1* | 1/2019 | Yan | G06T 7/70 |
| 2019/0108657 | A1* | 4/2019 | Petersen | G06T 11/206 |

OTHER PUBLICATIONS

Frank Steinbrukcker et al., "Real-Time Visual Odometry from Dense RGB-D Images", p. 1-4, ICCV 2011. (Year: 2011).*

R. Kummerle et al., "g2o: A General Framework for Graph Optimization", 2011 IEEE International Conference on Robotics and Automation, p. 3607-3613 (Year: 2011).*

Nadia Figueroa, et al., "From Sense to Print: Towards Automatic 3D Printing from 3D Sensing Devices," 2013 IEEE International Conference on Systems, Man, and Cybernetics, XP032557090, Oct. 13, 2013, pp. 4897-4904.

Richard A. Newcombe, et al., "KinectFusion: Real-Time Dense Surface Mapping and Tracking," IEEE International Symposium on Mixed and Augmented Reality 2011 Science and Technology Proceedings, XP032201443, Oct. 26-29, 2011, pp. 127-136.

Peter Henry, et al., "RGB-D Mapping: Using Depth Cameras for Dense 3D Modeling of Indoor Environments," 12$^{th}$ International Symposium on Experimental Robotics, XP055055175, Dec. 18, 2010, pp. 1-15.

International Search Report dated Dec. 23, 2014 in PCT/EP2014/068430 filed Aug. 29, 2014.

M. Dimashoa et al., "Tabletop Object Scanning with an RGB-D Sensor".

Office Action dated Sep. 4, 2018 in Japanese Patent Application No. 2017-530405, 5 pages (with English translation).

* cited by examiner

METHOD AND SYSTEM FOR SCANNING AN OBJECT USING AN RGB-D SENSOR

FIELD OF THE DISCLOSURE

The present disclosure is related to object scanning, and more precisely to obtaining three-dimensional models of objects using RGB-D sensors.

BACKGROUND OF THE DISCLOSURE

Obtaining three-dimensional models of scanned objects, also called three-dimensional reconstruction, has been a major focus in the fields of computer vision and robotics during the last decades. The launch of low-cost RGB-D sensors (Red-Green-Blue and Depth), which capture images accompanied with depth information, has boosted the interest in three-dimensional reconstruction. RGB-D sensors enable the development of methods delivering colored, metrically accurate reconstructions. These RGB-D sensors have become more and more important for many different fields such as manufacturing verification, gaming, robotics, object recognition, and object manipulation.

Methods for reconstructing three-dimensional models include in-hand methods, wherein an object facing a camera is carried by hand. This method requires intricate background segmentation in order to separate the object from the background. It has been proposed to solve this issue by the use of colored gloves on the hands of a user carrying the object. In-hand set-ups have proved to be reliable for objects having a distinctive appearance and small movements between frames. However, in-hands set-ups often fail to process objects with light geometrical and textural features because the determination of the transformation between frames is unreliable.

The use of robot arms has thus been proposed to support the object and to register arm poses to obtain the visual transformation that transforms a frame into another frame.

Alternatively, stationary set-ups have also been proposed, wherein the object to be scanned or reconstructed is placed on top of a rotating support surface. These set-ups may use markers on the support surface or they may even be founded on the use of sufficiently textured support surfaces. The use of a support surface having markers makes the segmentation easier and allows using stationary set-ups for any object without appearance constraints for the object.

One known method for reconstructing models is Microsoft's Kinectfusion™. This method employs an RGB-D sensor and a method known to the skilled man under the acronym ICP (Iterative Closest Point). Kinectfusion™ often fails in the reconstruction of models of various objects. More precisely, objects having symmetrical features or non-distinctive geometry are poorly reconstructed by Kinectfusion™. Kinectfusion™ also requires the user to specify volume boundaries and to participate in post-processing steps.

It should be noted that there is a trend towards systems that provide a good level of automation, and that reconstruct models of objects without requiring a thorough supervision by a user.

It is a primary object of the disclosure to provide methods and system that overcome the deficiencies of the currently available systems and methods.

SUMMARY OF THE DISCLOSURE

The present disclosure overcomes one or more deficiencies of the prior art by proposing a method for scanning an object.

According to embodiments of the present disclosure, the method comprises:

a plurality of elementary scans of the object using an RGB-D sensor and visual odometry, each elementary scan delivering a plurality of key frames associated with a pose of the sensor with respect to the object, and each elementary scan being associated with a position of the object, for each elementary scan, elaborating a three-dimensional model of the object using said plurality of key frames and poses of the scan, merging each three-dimensional model into a merged three-dimensional model of the object.

Visual odometry is a technique that uses both color and depth information for estimating the warp that corresponds to the motion observed by the sensor. This technique shows better results than ICP as it provides a better estimation of movements. This technique was disclosed in document "Real-time visual odometry from dense RGB-D images" (Frank Steinbrucker, Jurgen Sturm, and Daniel Cremers—ICCV Workshop, 2011), and in document "Tabletop Object Scanning with an RGB-D Sensor" (Maria Dimashova, Ilya Lysenkov, Vincent Rabaud, and Victor Eruhimov—ICRA Workshop, 2013).

By performing multiple scans, preferably with the object in different positions, portions of the object that were not visible by the sensor while the object was in a previous position may then be visible. The merged three-dimensional model of the object may therefore comprise the totality of the features of the object.

Each elementary scan may include a rotation of the object or a rotation of the sensor around the object, the object being in said position associated with the elementary scan.

An object may then be placed in a first position, scanned while rotating during an elementary scan, placed in another position which preferably shows hitherto hidden features, and scanned again while rotating during an elementary scan.

Loop closure may be detected after a revolution of the object or a revolution of the sensor around the object.

For example, detection of loop closure occurs after it is detected that the sensor has observed a substantial amount of transformation in comparison to the initial frame captured by the sensor. By way of example, this transformation may correspond to a rotation of 330° or two meters.

A pose graph optimization may be carried out on the poses of each elementary scan after detecting loop closure.

In order to refine sensor poses, pose graph optimization may be carried on using the framework known to the skilled man as G2o described in "G2o: A general framework for graph optimization" (Rainer Kummerle, Giorgio Grisetti, Hauke Strasdat, Kurt Konolige, and Wolfram Burgard—2011).

The elaboration of the three-dimensional model for each elementary scan may be made using a variational technique using colored signed distance fields and an approximate $L^1$ minimization.

Colored signed distance fields provide an accurate way to represent depth. Colored signed distance fields are described in document "Realtime camera tracking and 3d reconstruction using signed distance functions" (Erik Bylow, Jürgen Sturm, Christian Kerl, Frederik Kahl, and Daniel Cremers—RSS, 2013).

As concerns $L^1$ minimization, the use of a $L^1$ norm allows to differentiate accurately points obtained from key-frames in order to make precise alignment for large transformations (from one key-frame to another).

The elaboration of the merged three-dimensional model of the object may comprise a determination of the transformations that transforms each three-dimensional model into an initial three-dimensional model (for example the one obtained after the first elementary scan), said determination of the transformations comprising an alignment of each three-dimensional model into the initial three-dimensional model using an approximate $L^1$ norm.

The marching cube algorithm may be used on the merged three-dimensional model of the object in order to obtain a three-dimensional mesh of the object.

The positions of the object during at least two elementary scans may be different and may display different portions of the object to the sensor.

The method may comprise a segmentation of each key frame in order to separate the object from the background on the key frame.

According to embodiments of the present disclosure, a system for scanning an object is provided. This system comprises an RGB-D sensor intended to be directed towards the object.

According to a general aspect of this system, the system comprises:

means for scanning the object in a position using said RGB-D sensor and visual odometry, delivering a plurality of key frames associated with a pose of the sensor with respect to the object, means for elaborating a three-dimensional model of the object using a plurality of key frames and poses of a of a scan of the object, means for merging a plurality of three-dimensional models into a merged three-dimensional model of the object.

The system may comprise means for rotating the object or rotating the sensor around the object.

The system may comprise means for detecting loop closure after a revolution of the object or a revolution of the sensor around the object.

The system may comprise means for carrying out a pose-graph optimization on the poses of each elementary scan after detecting loop closure.

It should be noted that the system may be configured to perform the steps of the above-defined method.

BRIEF DESCRIPTION OF THE DRAWINGS

How the present invention may be put into effect will now be described by way of example with reference to the appended drawings, in which.

DESCRIPTION OF THE EMBODIMENTS

Reference will now be made in detail to exemplary embodiments of the disclosure, examples of which are illustrated in the accompanying drawings. Whenever possible, the same reference numbers will be used throughout the drawings to refer to the same or like parts.

Figure 1:
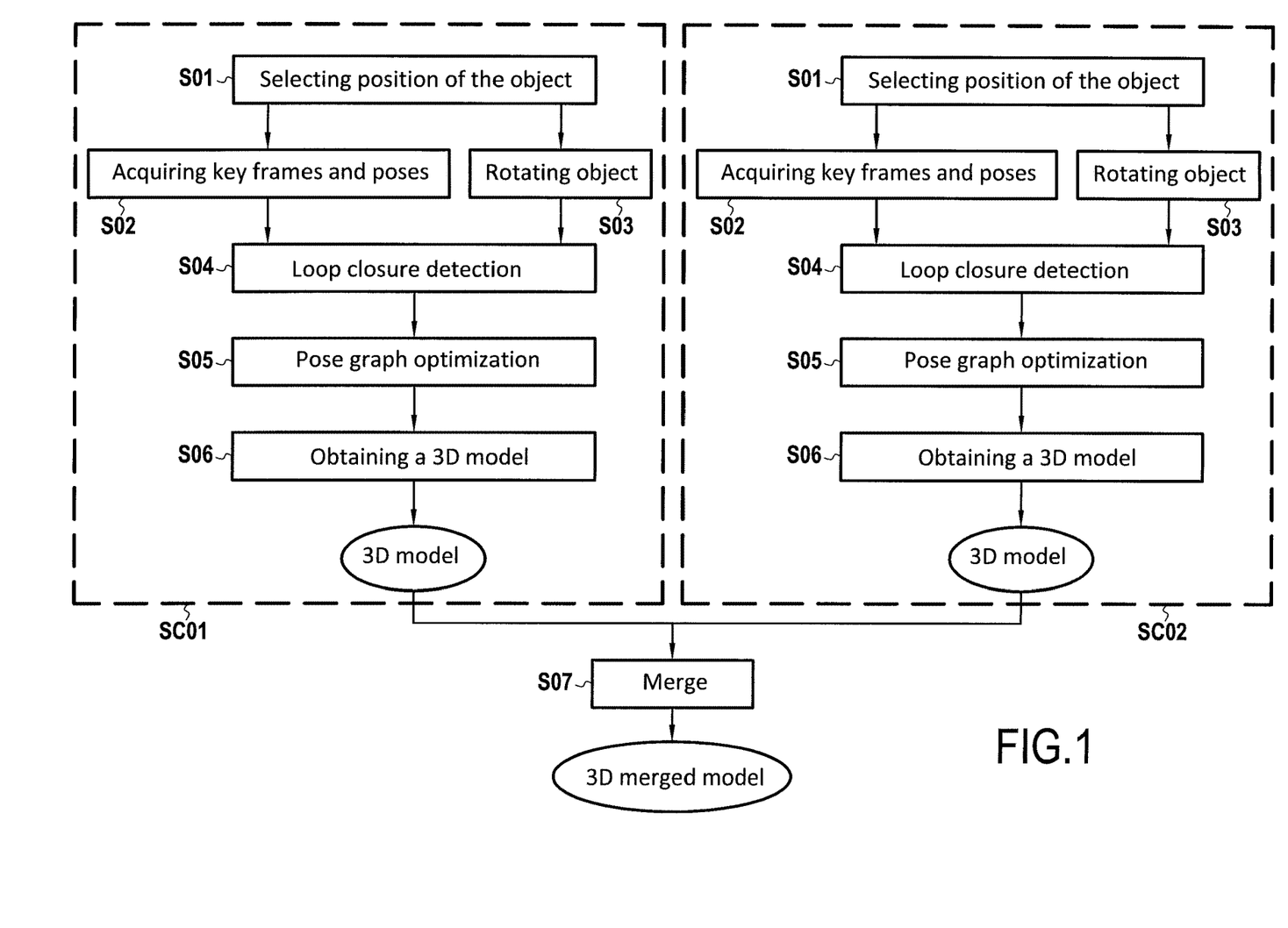
FIG. 1 is a block diagram of an exemplary method for scanning an object according to embodiments of the present disclosure.

FIG. 1 is a block diagram of an exemplary method for scanning an object and reconstructing a three-dimensional model of this object. This method uses an RGB-D sensor and, in the following example, means for rotating the object while the sensor is directed towards the object. Such means for rotating the object may comprise a rotating table.

It should be noted that according to the present disclosure, the means for rotating the object may not comprise markers.

It should also be noted that the steps of the method of FIG. 1 may be implemented using a processor implemented in a computer for receiving data from the sensor and processing this data.

The method of FIG. 1 comprises a first elementary scan SC01 and a second elementary scan SC02. More elementary scans may be carried out for objects having a geometry that requires a plurality of scans.

In a first step S01 of the first elementary scan SC01, a position of the object is selected, and the object is placed in this position upon the means for rotating the object.

Two steps S02 and S03 are then carried out in a quasi-simultaneous manner. Step S02 corresponds to an acquisition of key-frames and poses and step S03 corresponds to the rotation of the object using the means for rotating the object.

In order to obtain accurate poses of the sensor with respect to the object, segmentation may be carried out in order to separate the foreground from the background after the acquisition of key-frames. In order to perform this segmentation, an RGB-D sensor is defined as a pair:

$$[I:\Omega_2 \to [0,1]^3, D:\Omega_2 \to \mathbb{R}^+]$$

With $\Omega_2$ being the image plane, I the color image data, D the depth. The camera projection is denoted $\pi: \mathbb{R}^3 \to \Omega_2$. A plane is fitted into the cloud data $C:=\pi_D^{-1}$ and the prism spanned by the support plane along its normal direction is computed in order to determine the three-dimensional points lying inside the prism and to project these points into the image plane to create foreground segmentation mask.

Said prism corresponds to the three-dimensional shape that encloses the object. By way of example, the prism is defined by detecting the support on which the object sits, computing the normal to this support and extruding a three-dimensional box along that normal. Other shapes may be used in order to adapt to the shape of the support.

The sensor transformation is then determined using visual odometry, as described in document "Real-time visual odometry from dense RGB-D images" (Frank Steinbrucker, Jurgen Sturm, and Daniel Cremers—ICCV Workshop, 2011). More precisely, the rigid body movement $\Xi \in SE(3)$ of the sensor between two consecutive sensor pairs $[I_0, D_0]$, $[I_1, D_1]$ by maximizing the photo-consistency:

$$E(\Xi) = \int_{\Omega_2} [I_1(w_\Xi(x)) - I_0(x)]^2 dx$$

With $w_\Xi: \Omega_2 \to \Omega_2$, defined as $w_\Xi(x) = \pi_{D_0}(\Xi \cdot \pi_{D_1}^{-1}(x))$, the function that transforms and projects the colored point cloud from one frame into the other. This may be solved as a least-squares problem, and may be solved using a Gauss-Newton approach with a coarse-to-fine scheme.

It should be noted that using an RGB-D sensor and visual odometry is advantageous because it is suitable for handling objects having poor geometrical discriminating features. Visual odometry is also highly suitable for objects exhibiting a high amount of texture and for supports also exhibiting a high amount of texture.

During the estimation of the transformation in-between frames, key-frame pairs $[I_i, D_i]$ are stored, as well as the corresponding pose $P_i$ and the pose $P_{i-1}$ from the previously stored key-frame. Two consecutive key-frames and poses may be separated by a minimal angle and distance, for example 10° and 10 centimeters.

In step S04, loop-closure is detected after a substantial amount of transformation has been observed (from $[I_0, D_0]$ and the corresponding pose $P_0$). By way of example, a transformation of 330° or two meters may correspond to loop-closure.

Pose-graph optimization is then carried out (step S05), for example using the G2o framework in order to refine the camera poses while an error measure based on the visual odometry energy is used. The error function, as described in document "G2o: A general framework for graph optimization" (Rainer Kummerle, Giorgio Grisetti, Hauke Strasdat, Kurt Konolige, and Wolfram Burgard—2011), which is minimized is then the visual odometry energy.

In step S06, a three-dimensional model is obtained. More precisely, sensor pairs and poses define a three-dimensional denoted as an hemisphere $H=\{(I_i, D_i, P_i)i\}$.

In step S06, the data corresponding to the hemispheres is casted into volumetric fields $f_i:\Omega_3 \subset \mathbb{R}^3 \to \mathbb{R}$ in order to smoothly integrate them into one fused model, with i an indicia of the elementary scan. A truncated signed distance field is created by shooting rays and computing the signed distance from the surface for each point $x\in\Omega_3$ along the line of sight. Points in front of the object receive positive values while the points behind the surface receive negative values. The volumetric fields may be written as:

$$f_i(x) = \psi(D_i(\pi(x)) - \|x - P_i^{xyz}\|),$$

With:

$$\psi(d) = \begin{cases} \text{sgn}(d) & \text{if } |d| > \delta \\ \dfrac{d}{\delta} & \text{else} \end{cases},$$

$P_i^{xyz}$ being the camera center for pose $P_i$, $\delta$ being a parameter corresponding to a tolerance towards measurement noise in the depth data, which should be set by taking into consideration the depth sensor fidelity. By way of example, $\delta$ may be of the order of two millimeters.

$f_i$ is associated with a binary function $w_i:\Omega_3 \to \{0,1\}$ that indicates which parts of the signed distance field should be taken into account during the fusion:

$$w_i = \begin{cases} 1 & \text{if } D_i(\pi(x)) - \|x - P_i^{xyz}\| < -\eta \\ 0 & \text{else} \end{cases}$$

With $\eta$ being a parameter defining how much has been seen behind the observed surface and assumed to be solid (for example $\eta$ may be equal to one centimeter). In order to recover the color of the object as well, a color volume $c_i:\Omega_3 \to [0,1]^3$ is defined as follows.

$$c_i(x) = I_i(\pi(x))$$

A colored signed distance field may therefore be referred to as $[f_i, c_i]$. In order to obtain the two functions u, v which correspond respectively to the reconstructed object geometry and coloring, the problem is casted into a variational energy optimization formulation, and its minimizers are sought:

$$\varepsilon(u,v) = \int_{\Omega_3} [\mathcal{D}(f, \mathcal{W}, c, u, v) + \alpha \mathcal{S}(\nabla u) + \beta(\mathcal{S}(\nabla v)] dx$$

With $\mathcal{D}$ being the solution corresponding to all the elementary scans: $f = \{f_1, \ldots, f_n\}$, $\mathcal{W} = \{w_1, \ldots, w_n\}$, and $c = \{c_1, \ldots, c_n\}$. $\mathcal{S}(\nabla u)$ and $\mathcal{S}(\nabla v)$ being two regularizers respectively weighted by two parameters $\alpha$ and $\beta$. $\alpha$ and $\beta$ are chosen to smooth the minimizers.

It should be noted that contrary to the state of the art, geometrical fields are not the only fields merged or fused together, according to the present disclosure, color information is also used in the formulations.

A total variation regularizer $\mathcal{S}$ is then used:

$$\mathcal{D}(f, \mathcal{W}, c, u, v) = \frac{1}{\epsilon + \sum_i w_i} \sum_i w_i \cdot (|u - f_i| + |v - c_i|),$$

$$\mathcal{S}(\nabla u) = |\nabla u|$$

In order to solve these energies, the problematic terms are replaced with an approximate $L^1$ norm which may be denoted $\Gamma(x) := \sqrt{x^2 + \epsilon}$.

$$\mathcal{D}(f, \mathcal{W}, c, u, v) = \Gamma\left(\sum_i w_i\right)^{-1} \sum_i w_i \cdot (\Gamma(u - f_i) + \Gamma(v - fc_i)),$$

$$\mathcal{S}(\nabla u) = \Gamma(|\nabla u|)$$

The weighted approximate absolute differences $\mathcal{D}(f, \mathcal{W}, c, u, v)$ are regarded together with an additional normalization factor $\Gamma(\Sigma_i w_i)^{-1}$ and an approximate total variation regularizer.

The above defined convex and differentiable formulation leads to the following minimizers that can be found at the steady state of the gradient descent equations:

$$\partial u = \alpha \cdot \text{div}(\mathcal{S}'(\nabla u)) - \frac{\partial \mathcal{D}}{\partial u}(f, \mathcal{W}, c, u, v)$$

$$\partial v = \beta \cdot \text{div}(\mathcal{S}'(\nabla v)) - \frac{\partial \mathcal{D}}{\partial v}(f, \mathcal{W}, c, u, v)$$

These global minimizers are determined and denoted $u^*$, $v^*$. The reconstructed three-dimensional model is then:

$$\phi:\Omega_3 \to [-1,+1] \times [0,1]^3$$

With $\phi = [u^*, v^*]$.

The above defined calculation may be implemented for each elementary scan SC0j, and the provide a plurality of models $\phi_j$.

Two models are obtained from elementary scans SC01 and SC02. These two models are merged, or fused, in step S07.

In step S07, the models $\phi_j$ are aligned to $\phi_0$ the first model. The three-dimensional rigid-body transformation $\Xi_j$ needs to be determined. This problem has six degrees of freedom, and a minimal representation of the representation of the transformation parameterized via a twist vector $\xi = [\omega_x, \omega_y, \omega_z, t_x, t_y, t_z]^T \in \mathbb{R}^6$ is chosen. The corresponding Lie algebra twist is denoted $\hat{\xi} \in se(3)$ and the exponential mapping from the Lie group $\Xi \in SE(3)$:

$$\hat{\xi} = \begin{pmatrix} 0 & -\omega_z & \omega_y & t_x \\ \omega_z & 0 & -\omega_x & t_y \\ -\omega_y & \omega_x & 0 & t_z \\ 0 & 0 & 0 & 0 \end{pmatrix}, \Xi = \exp(\hat{\xi}) = \begin{pmatrix} R & T \\ 0 & 1 \end{pmatrix}$$

With R being a 3×3 rotation matrix, T being a translation vector having three components $t_x$, $t_y$, and $t_z$.

The goal is that, for every point x, $\phi_0(x) = \phi_j(\Xi(x))$, where $\Xi(x):\mathbb{R} \to \mathbb{R}^3$ denotes the homogeneous transformation parameterized by $\xi$ and applied to the point x. Because exact solutions do not exist in practice, a minimization is carried out. More precisely, the distance is minimized by an energy formulation using an appropriate measure M:

$$\varepsilon(\Xi) = \int_{\Omega_3} M(\phi_0(x), \phi_j(\Xi(x))) dx$$

It should be noted that contrary to the Kinectfusion approach, the registration problem is solved in a continuous manner while solving an algebraic error.

At this stage, an $L^2$ norm may be used:

$$\varepsilon(\Xi)_{L^2} = \int_{\Omega_3} \frac{1}{2} (\phi_0(x), \phi_j(\Xi(x)))^2 dx$$

However, the approximate $L^1$ norm has shown to be more robust:

$$\varepsilon(\Xi)_{L^1} = \int_{\Omega_3} \Gamma(\phi_0(x), \phi_j(\Xi(x))) dx$$

The $L^1$ norm outperforms the $L^2$ norm in terms of wider convergence basin and speed.

Other measures M may also be applied such as correlation ratios or mutual information. A gradient descent scheme to update the transformation parameters is then applied. Starting from an initial transformation $\Xi^0$, the following equations are iteratively solved (depending on the measure used):

$$\nabla \xi = -\frac{1}{|\Omega_3|} \left( -\frac{\partial \phi_j}{\partial \Xi^i} \cdot \frac{\partial \Xi^i}{\partial \xi} \right) \cdot (\phi_0 - \phi_j(\Xi^i)) \text{ for } L^2$$

$$\nabla \xi = -\frac{1}{|\Omega_3|} \left( -\frac{\partial \phi_j}{\partial \Xi^i} \cdot \frac{\partial \Xi^i}{\partial \xi} \right) \cdot \Gamma'(\phi_0 - \phi_j(\Xi^i)) \text{ for } L^1$$

$$\Xi^{i+1} = \exp(\tau \cdot \nabla \hat{\xi}) \cdot \Xi^i$$

To ensure proper numerical update, a twist update $\nabla \xi$ is used with the Jacobian $$\frac{\partial \phi_j}{\partial \Xi^i} \cdot \frac{\partial \Xi^i}{\partial \xi},$$

a gradient step size $\tau$ and an additional normalization $$\frac{1}{|\Omega_3|}$$

are used.

The proposed energy admits local optima and therefore depends on the initialization. A robust convergence has been observed. In order to process large rotational differences in-between the models, it is proposed to search in a spherical grid by sampling spherical coordinates in the ranges $\theta \in (0, \pi)$, $\kappa \in (0, 2\pi)$ in discrete steps and run the alignment until convergence.

In order to speed up the registration process, it is possible to use a coarse-to-fine pyramid scheme over three levels where down-sampled models are roughly aligned and the resulting alignment is taken as the initialization into the next pyramid stage.

After deciding the best alignment $\Xi_j$, the models are merged or fused by merging the element from the model into the first model while transforming the poses. A reconstruction is then carried out.

The marching cube algorithm may then be used to extract a mesh of the three-dimensional merged model.

Figure 2:
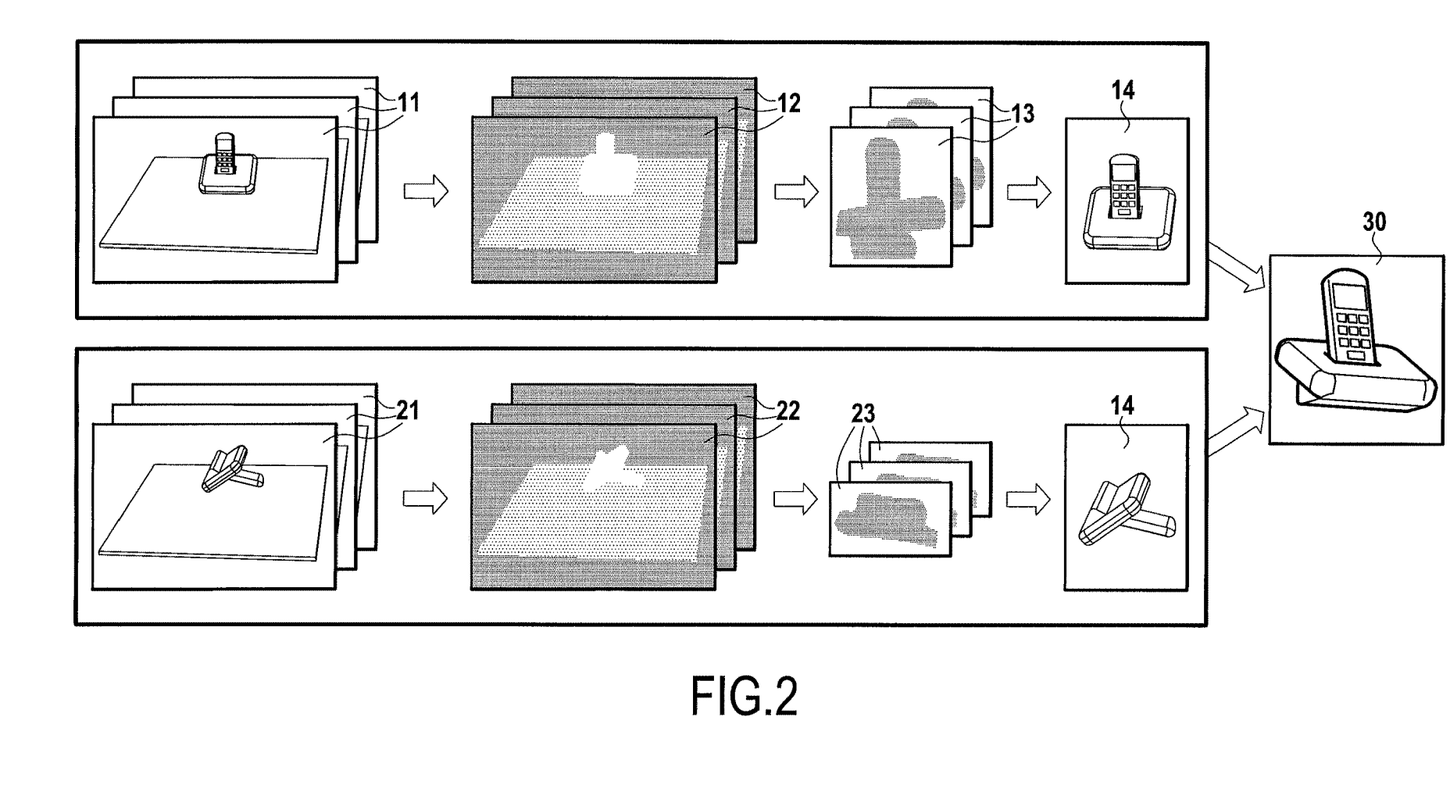
FIG. 2 is a schematic representation of the method of FIG. 1, FIGS. 3 and 4 are comparisons of meshes obtained by Kinectfusion and by embodiments of the present disclosure.

FIG. 2 is a schematic representation of the method of FIG. 1, wherein the two elementary scans SC01 and SC02 correspond respectively to an elementary scan of a telephone on a surface and to an elementary scan of an upside-down telephone on the surface.

In the first elementary scan SC01, several key-frames 11 are captured (steps S02 and S03 of FIG. 1). A segmentation is carried out to obtain segmented key-frames 12 in which the object, its support, and the background are separated. Visual odometry and pose graph optimization are then used (steps S04 and S05) to obtain key-frames 13. These frames are then merged into a model 14 which is a three-dimensional model of the telephone positioned on the surface.

In order to incorporate the features of the bottom of the telephone, the second elementary scan SC02 is carried out. Several key-frames 21 are captured (steps S02 and S03 of FIG. 1). Segmentation is carried out to obtain segmented key-frames 22. Visual odometry and pose graph optimization are then used (steps S04 and S05) to obtain key-frames 23. These frames are then merged into a model 24 which is a three-dimensional model of the telephone positioned upside-down on the surface.

The two models obtained are aligned and merged into the merged three-dimensional model 30.

Figure 3:
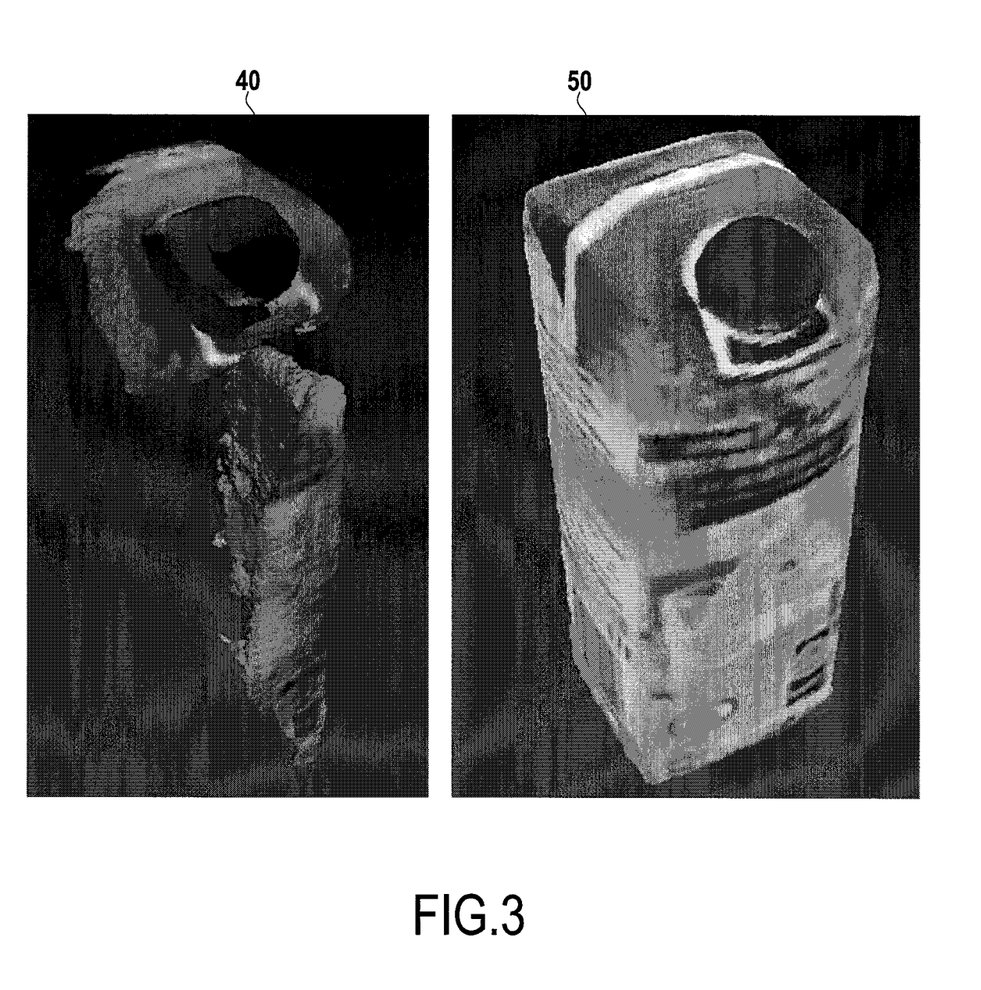
Figure 4:
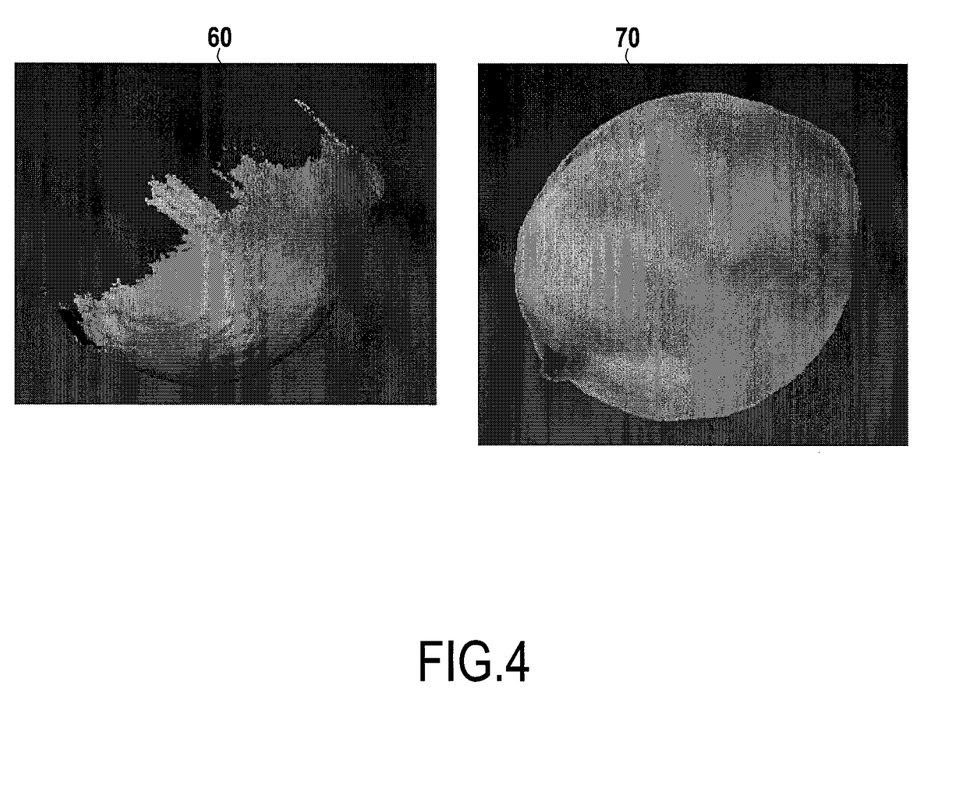

FIGS. 3 and 4 are representations of three dimensional models obtained by Kinectfusion and according to an embodiment of the present disclosure. More precisely, the software commercialized under the name Recfusion by German company Imfusion GmbH has been used in order to present the results obtained by Kinectfusion. For each object, 800 frames were acquired by a fixed sensor, and a rotating support was used. The support was moved by hand so that a rotation of approximatively 360° was covered while the 800 frames were acquired. The successive frames differed only by a small rotation, the angular value of this small rotation being random due to the rotation by hand.

In ICP, all the frames were used to estimate the poses. According to an embodiment of the invention, it is possible to use every frame in order to obtain the poses via visual odometry, but only specific key frames may be used for the graph optimization and the fusion into a model. By way of example, key frames may be frames that differ from the previous key frame by a movement of 15° or 10 centimeters, these criteria provide a good reconstruction of the object and limit the computation time.

The objects represented on FIGS. 3 and 4 do not show multiple sides or intricate geometries that allow observation of the result of a plurality of elementary scans. However, these object display the advantageous use of pose-graph optimization and of the $L^1$ norm.

On FIG. 3, two three-dimensional models of a carton of milk are represented. A first three-dimensional model 40 is obtained using Kinectfusion. As can be observed on the model 40, a large part of the milk carton is missing, due to the inability of Kinectfusion to reconstruct symmetrical objects.

Model 50 was obtained according to an embodiment of the present disclosure. As can be seen on the figure, the milk carton is entirely reconstructed.

Models 40 and 50 were both created using a voxel size of one millimeter, and both models were done using the same frames as initial data.

FIG. 4 is another example of a reconstructed object, here a mango. Model 60, obtained through Kinectfusion, is incomplete. Model 70, obtained according to an embodiment of the present disclosure, displays a complete mango.

According to embodiments of the present disclosure, a full three-dimensional reconstruction method is obtained.

This method outperforms the current solution by providing more accurate results.

The invention claimed is:

1. A method for scanning an object comprising:
generating a plurality of elementary scans of the object using an RGB-D sensor, each elementary scan including a plurality of frames;
using each of the plurality of frames of the respective elementary scans to obtain poses of the scan via visual odometry, and for each elementary scan selecting a plurality of key frames from the plurality of frames with respect to the object, wherein each elementary scan performed with the object is in a different position relative to the sensor;
for each elementary scan, rotating the object or rotating the sensor around the object, the object being in the position associated with the respective elementary scan;
for each elementary scan, elaborating a three-dimensional model of the object using the plurality of key frames and poses of the scan; and
merging each three-dimensional model into a merged three-dimensional model of the object, wherein
the merging comprises determining transformations that transform said each three-dimensional model into an initial three-dimensional model,
the determining the transformations comprises aligning said each three-dimensional model into the initial three-dimensional model using an approximate L1 norm, and
the elaborating the three-dimensional model for each elementary scan is made using a variational technique using colored signed distance fields and an approximate $L^1$ minimization.

2. The method according to claim 1, wherein loop closure is detected after a revolution of the object or a revolution of the sensor around the object.

3. The method according to claim 2, wherein a pose graph optimization is carried out on the poses of each elementary scan after detecting loop closure.

4. The method according to claim 1, further comprising using the marching cube algorithm on the merged three-dimensional model of the object to obtain a three-dimensional mesh of the object.

5. The method according to claim 1, wherein positions of the object during at least two elementary scans display different portions of the object to the sensor.

6. The method according to claim 1, further comprising a segmentation of each key frame to separate the object from the background on the key frame.

7. A system for scanning an object, comprising:
an RGB-D sensor configured to be directed towards the object;
means for rotating the object or rotating the sensor around the object; and
means for receiving and processing data from the RGB-D sensor for a plurality of elementary scans of the object, each elementary scan including a plurality of frames;
the means for receiving and processing data
using each of the plurality of frames of the respective elementary scans to obtain poses of the scan via visual odometry,
selecting a plurality of key frames from the plurality of frames with respect to the object, wherein each elementary scan performed with the object is in a different position relative to the sensor,
elaborating a three-dimensional model of the object using the plurality of key frames and poses of the scan of the object obtained by the rotating, and
merging a plurality of three-dimensional models into a merged three-dimensional model of the object, each of the plurality of three-dimensional models scanned using the RGB-D sensor at a respective different position of the object, wherein
the merging comprises determining transformations that transform each of the plurality of three-dimensional models into an initial three-dimensional model,
the determining the transformations comprises aligning said each three-dimensional model into the initial three-dimensional model using an approximate L1 norm, and
the elaborating the three-dimensional model for each elementary scan is made using a variational technique using colored signed distance fields and an approximate $L^1$ minimization.

8. The system according to claim 7, further comprising means for detecting loop closure after a revolution of the object or a revolution of the sensor around the object.

9. The system according to claim 8, further comprising means for carrying out a pose-graph optimization on the poses of each elementary scan after detecting loop closure.

10. A system for scanning an object, comprising:
an RGB-D sensor configured to be directed towards the object;
a rotating table or robot arm that rotates the object; and
processing circuitry configured to
receive and process data from the RGB-D sensor for a plurality of elementary scans of the object, each elementary scan including a plurality of frames,
use each of the plurality of frames of the respective elementary scans to obtain poses of the scan via visual odometry,
select a plurality of key frames from the plurality of frames with respect to the object, wherein each elementary scan performed with the object is in a different position relative to the sensor,
elaborate a three-dimensional model of the object using the plurality of key frames and poses of the scan of the object obtained by the rotating, and
merge a plurality of three-dimensional models into a merged three-dimensional model of the object, each of the plurality of three-dimensional models scanned using the RGB-D sensor at a respective different position of the object, wherein
the merge comprises determining transformations that transform each of the plurality of three-dimensional models into an initial three-dimensional model,
the determining the transformations comprises aligning said each three-dimensional model into the initial three-dimensional model using an approximate L1 norm, and
the elaborate the three-dimensional model for each elementary scan is made using a variational technique using colored signed distance fields and an approximate $L^1$ minimization.

* * * * *